United States Patent [19]

Nahass et al.

[11] Patent Number: 5,591,382
[45] Date of Patent: Jan. 7, 1997

[54] HIGH STRENGTH CONDUCTIVE POLYMERS

[75] Inventors: Paul R. Nahass, Cambridge; Stephen O. Friend, Boxford; Robert W. Hausslein, Lexington, all of Mass.

[73] Assignee: Hyperion Catalysis International Inc., Cambridge, Mass.

[21] Appl. No.: 40,895

[22] Filed: Mar. 31, 1993

[51] Int. Cl.$^6$ .................. H01B 1/20; H01B 1/24
[52] U.S. Cl. ............ 252/511; 252/502; 106/472; 524/496
[58] Field of Search .................... 252/502, 510, 252/511; 106/472; 524/496

[56] References Cited

U.S. PATENT DOCUMENTS

| | | | |
|---|---|---|---|
| 4,351,746 | 9/1982 | Parish et al. | 252/511 |
| 4,404,125 | 9/1983 | Abolins et al. | 252/511 |
| 4,559,164 | 12/1985 | Kostelnik et al. | 252/511 |
| 4,663,230 | 5/1987 | Tennent | 428/367 |
| 4,664,900 | 5/1987 | Miyazaki et al. | 252/510 |
| 4,664,971 | 5/1987 | Soens | 252/511 |
| 4,696,956 | 9/1987 | Nabeta et al. | 252/511 |

*Primary Examiner*—Paul Lieberman
*Assistant Examiner*—M. Kopec
*Attorney, Agent, or Firm*—Curtis, Morris & Safford, P.C.

[57] ABSTRACT

A polymeric composition having improved toughness and conductivity comprising carbon fibrils, at least a portion of which are in the form of aggregates, wherein, as measured on an area basis, substantially all of the aggregates are less than about 35 μm in diameter. A polymeric composition having improved toughness and conductivity is prepared by combining carbon fibrils, at least a portion of which are in the form of aggregates, with a polymeric material, mixing the combination to distribute the fibrils in the polymeric material and applying shear to the combination to break down the aggregates until substantially all of the aggregates are less than about 35 μm in diameter.

33 Claims, No Drawings

HIGH STRENGTH CONDUCTIVE POLYMERS

FIELD OF THE INVENTION

The invention relates generally to conductive polymers and more particularly to electrically conductive, static-dissipative and anti-static polymers having superior toughness.

BACKGROUND OF THE INVENTION

Electrically conductive polymeric materials are desirable for many applications including the dissipation of electrostatic charge from parts, electrostatic spray painting and the shielding of electrical components to prevent transmission of electromagnetic waves. The primary method of increasing the electrical conductivity of polymers is to fill them with conductive additives such as metallic powders, metallic fibers, ionic conductive polymers, intrinsically conductive polymeric powder, e.g., polypyrrole, carbon fibers or carbon black. However, each of these approaches has some shortcomings. Metallic fiber and powder enhanced polymers have poor corrosion resistance and insufficient mechanical strength. Further, their density makes high weight loadings necessary. Thus, their use is frequently impractical.

When polyacrylonitrile ("PAN") or pitch-based carbon fiber is added to create conductive polymers the high filler content necessary to achieve conductivity results in the deterioration of the characteristics specific to the original resin. If a final product with a complicated shape is formed by injection molding, uneven filler distribution and fiber orientation tends to occur due to the relatively large size of the fibers, which results in non-uniform electrical conductivity.

Principally because of these factors and cost, carbon black has become the additive of choice for many applications. The use of carbon black, however, also has a number of significant drawbacks. First, the quantities of carbon black needed to achieve conductivity of the polymer are relatively high, i.e. 10–60%. Second, the high morphological "structure" of conductive carbon blacks is subject to breakdown during high shear melt processing. This morphological structure contributes to a reduction of the toughness characteristics to the point where they become too low for many applications. Even when toughness levels are suitable for a given application, the sloughing or rubbing off of the carbon black from the surface of the product may be a problem. Finally, the chemical impurities which are inherent in and result from the typical carbon black manufacturing process, make the use of these materials impractical in, for example, automobile parts.

Carbon fibrils have been used in place of carbon black in a number of applications. For example, it has been recognized that the addition of carbon fibrils to polymers in quantities less than that of carbon black, can be used to produce conductive end products. (See, e.g. Creehan, U.S. application Ser. No. 896,317, filed Jun. 10, 1992, which application is assigned to the same assignee as the present application and is hereby incorporated by reference). It has also been recognized that the addition of carbon fibrils to polymers can be used to enhance the tensile and flexural characteristics of end products. (See, e.g. Goto et al., U.S. application Ser. No. 511,780, filed Apr. 18, 1990, which application is assigned to the same assignee as the present application and is hereby incorporated by reference.)

Carbon fibrils are typically in the form of vermicular tubes with graphitic outer layers disposed substantially concentrically about the cylindrical axis of the fibril. Preferably, the fibrils are substantially free of a pyrolytically deposited thermal carbon overcoat.

Carbon fibrils have a length-to-diameter ratio of at least 5, and more preferably at least 100. Even more preferred are fibrils whose length-to-diameter ratio is at least 1000. The wall thickness of the fibrils is about 0.1 to 0.4 times the fibril external diameter which is preferably between 3.5 and 75 nanometers. In applications where high strength fibrils are needed, e.g., where the fibrils are used as reinforcements, the external fibril diameter is substantially constant over its length.

Prior work by Moy et al., U.S. application Ser. No. 855,122, filed Mar. 18, 1992, which application is assigned to the same assignee as the present application and is hereby incorporated by reference, and Uehara et al., U.S. application Ser. No. 654,507, filed Feb. 23, 1991, which application is assigned to the same assignee as the present application and is hereby incorporated by reference, have disclosed the production of fibril aggregates and their usage in creating conductive polymers.

Moy et al. disclose the production of a specific type of carbon fibril aggregate, i.e. combed yarn, and allude to its use in composites. It does not teach how to use quantities of this aggregate to successfully achieve both conductivity and acceptable notched impact strength or tensile elongation in polymeric compositions. Uehara et al. also disclose the use of fibril aggregates in polymeric materials. The fibril aggregates have a preferred diameter range of 100–250 microns. When these fibril aggregates are added to polymeric compositions and processed, conductivity is achieved. However, notched impact strength is too low for use in most impact situations.

OBJECTS OF THE INVENTION

It is an object of the invention to provide a conductive, static-dissipative or anti-static polymeric composition which can be easily molded into an end product with a satisfactory surface appearance and toughness at least commensurate with industry standards.

It is another object of the invention to provide a conductive, static-dissipative or anti-static polymeric composition comprising carbon fibrils, where the fibrils comprise aggregates of a sufficiently small diameter such that the composition has mechanical properties at least commensurate with industry standards.

It is a further object of the invention to provide a fibril loaded conductive, static-dissipative or anti-static polymeric composition which has notched impact strength greater than 75% of the notched impact strength of the virgin polymeric composition.

It is yet another object of the invention to provide a polymeric masterbatch composition which can be diluted to yield a conductive, static-dissipative or anti-static end product with relatively low fibril filler content and mechanical properties at least commensurate with industry standards.

It is a still further object of the invention to provide a method for preparing a conductive, static-dissipative or anti-static polymeric composition comprising carbon fibrils, at least a portion of which are in the form of aggregates, where the processing of the composition results in the reduction of the size of the fibril aggregates such that the mechanical properties of a resultant end product are at least commensurate with industry standards.

SUMMARY OF THE INVENTION

It has been unexpectedly found that the addition of 0.25–50 wt % of carbon fibrils, at least a portion of which are in the form of aggregates, to polymeric compositions can provide both commercially acceptable conductivity and toughness, when the size of substantially all of the aggregates, as measured on an area basis, are reduced below 35 μm. Preferably, at least 90% of the aggregates, as measured on an area basis, are less than 25 μm in diameter. More preferably, at least 90% of the aggregates, as measured an area basis, are less than 5 μm in diameter.

The invention also comprises a polymeric masterbatch composition having 1.0–60 wt % of carbon fibrils, substantially free, as measured on an area basis, of fibril aggregates greater than about 50 μm. At least 95% of the existing fibril aggregates, as measured on an area basis, are preferably less than 35 μm in diameter.

A conductive, static-dissipative or anti-static polymeric composition having acceptable toughness may be prepared by combining 0.25–50 wt % of carbon fibrils with one or more selected polymeric materials. The combination is mixed to distribute the fibrils, at least a portion of which are in the form of aggregates, in the polymeric material. Shear is applied to the combination to break down the aggregates until as measured on an area basis, substantially all of the aggregates are less than 35 μm in diameter.

The composition is preferably molded into an end product of a desired shape having volume resistivity less than about $1\times10^{11}$ ohm-cm and IZOD notched impact strength greater than 0.5 ft-lbs/in; more preferably greater than 2 ft-lbs/in; and most preferably greater than 5 ft-lbs/in or tensile elongation of at least 75% of the virgin polymeric material. This combination of characteristics makes the present invention suitable for use in a wide range of situations requiring toughness.

DETAILED DESCRIPTION

Production of Carbon Fibrils

Fibrils are prepared by contacting a carbon-containing gas with a metal catalyst in a reactor for an appropriate period of time, at a suitable pressure, and at a temperature sufficient to produce fibrils with the above-described morphology. Reaction temperatures are generally 400°–850° C. more preferably 600°–750° C. Fibrils are advantageously prepared continuously by bringing the reactor to the reaction temperature, adding metal catalyst particles, and then continuously contacting the catalyst with a carbon-containing gas.

Examples of suitable feed gases include aliphatic hydrocarbons, e.g., ethylene, propylene, propane, and methane; carbon monoxide; aromatic hydrocarbons, e.g., benzene, naphthalene, and toluene; and oxygenated hydrocarbons.

Preferred catalysts contain iron and, preferably, at least one element chosen from Group V (e.g., molybdenum, tungsten, or chromium), VII (e.g., manganese), or the lanthanides (e.g., cerium). The catalyst, which is preferably in the form of metal particles, may be deposited on a support, e.g., alumina and magnesia.

Fibrils may be prepared in a manner such that at least a portion of the fibrils are in the form of aggregates. As used herein, an aggregate is defined as two or more entangled fibrils. Fibril aggregates typically have macroscopic morphologies, as determined by scanning electron microscopy, in which they are randomly entangled with each other to form entangled balls of fibrils resembling a bird's nest ("BN"); or as aggregates consisting of bundles of straight to slightly bent or kinked carbon fibrils having substantially the same relative orientation, and having the appearance of combed yarn ("CY") e.g., the longitudinal axis of each fibril, despite individual bends or kinks, extends in the same direction as that of the surrounding fibrils in the bundles; or, as aggregates consisting of straight to slightly bent or kinked fibrils which are loosely entangled with each other to form an "open net" ("ON") structure. In open net structures the degree of fibril entanglement is greater than observed in the combed yarn aggregates (in which the individual fibrils have substantially the same relative orientation) but less than that of bird's nest. CY and ON aggregates are more readily dispersed in polymers than BN aggregates eliminating local stress concentrations and making them potentially more useful in composite fabrication where better mechanical properties throughout the structure are desired. The substantial linearity of the individual fibril strands also makes the aggregates more effective in EMI shielding and other electrical applications.

The macroscopic morphology of the aggregates is controlled by the choice of catalyst support. Spherical supports grow fibrils in all directions leading to the formation of bird's nest aggregates. Combed yarn and open net aggregates are prepared using supports having one or more readily cleavable planar surfaces, e.g., an iron or iron-containing metal catalyst particle deposited on a support material having one or more readily cleavable surfaces and a surface area of at least 1 square meter per gram.

Preferred support materials include activated alumina or magnesia in the form of aggregates of tabular, prismatic, or platelet crystals. Such material is commercially available, e.g., from Alcoa, in the case of activated alumina, and Martin Marietta, in the case of magnesia. The activated alumina supports yield primarily combed yarn aggregates, while the magnesia supports yield primarily open net aggregates. Spherical gamma alumina particles, which yield bird's nest aggregates, are available from Degussa.

It is believed that deposition of a catalyst on a support consisting of readily cleavable planar surfaces allows the fibrils to assist each other as they grow, creating a "neighbor" effect. As the catalyst particles deposited on the flat surfaces initiate fibril growth, the individual fibrils are influenced by their "neighbors." In the case of the activated alumina support, this leads to a combed yarn fibril aggregate in which the individual fibrils have the same relative orientation. The magnesia supports, although having readily cleavable planar surfaces, yield primarily lightly entangled, open net fibril aggregates because they break apart more readily into smaller particles than the activated alumina support during fibril growth. This results in aggregates that are less ordered than the combed yarn aggregates but more ordered than the tightly entangled fibril balls. The oxide precursors used to generate the metal catalyst particles also affect the tendency of the support to break apart. The more readily the oxide and support can form a mixed oxide at the interface between them, the more likely the support is to break apart.

The yield of catalysts for the manufacture of carbon fibrils and carbon fibril aggregates can be substantially improved by contacting a fibril-forming catalyst with an effective yield-enhancing amount of a carboxylate, such as a lower carboxylic acid or a salt thereof. The method is preferably carried out by precipitating an effective amount of a fibril-producing metal ion from an aqueous solution onto particles of a support material in the presence of a carboxylate, such as an anion of a water-soluble carboxylic acid, preferably having 1 to 4 carbon atoms.

Another method which substantially improves the manufacture of catalysts for the production of carbon fibrils and fibril aggregates includes the step of coprecipitating a compound of a metal having fibril-forming catalytic properties and an aluminum or magnesium compound under controlled pH conditions to form a catalyst comprising a compound of aluminum or magnesium and a compound of the metal(s). Desirably an aqueous solution of an iron and/or molybdenum salt and an aluminum salt is formed and the metals coprecipitated to form a mixed oxide catalyst.

Fibril-forming catalysts may also be advantageously supported on carbon particles and desirably on carbon fibril aggregates composed of carbon fibrils of particular characteristics. The active fibril-forming metal is desirably iron or iron and molybdenum and preferably these active metal catalysts are deposited on the fibril aggregates as mixed oxides with alumina or magnesia as described above.

These methods of making fibril-forming catalysts and these catalysts themselves substantially increase the yield of fibrils per unit of fibril-forming catalytic metal. Carboxylate treatment during the making of fibril-forming catalysts yields catalysts with higher productivity. Coprecipitation of catalyst metals(s) and aluminum or magnesium compounds provides catalyst with higher loadings of active metal(s) and therefore higher productivities. Further, use of fibril aggregates as catalyst supports lend themselves to large scale fibril producing processes. These catalysts can be used to produce not only fibrils such as are described in Tennent, U.S. Pat. No. 4,663,230—although the fibrils of the invention have higher purity as made—but also fibrils having different macromorphologies, such as the so-called fishbone ("FB") morphology as described in published European Patent Application No. 198,558 to J. W. Geus (published Oct. 22, 1986).

Polymers

In accordance with the invention, between 0.25 and 50 weight percent of carbon fibrils are added to selected organic and inorganic polymers. More preferably between 2–5 weight percent of carbon fibrils are added to selected polymers. Generally, preferred classes of polymers include thermosets, thermoplastics, elastomers and inorganics. Certain polymeric alloys, defined as two or more miscible or partially miscible polymers, and blends, defined as discrete non-miscible phases, are also preferred. Specific examples of thermosets and elastomers include polyurethanes, natural rubber, synthetic rubber, epoxy, phenolic, polyesters, polyamides, and silicones. Specific examples of thermoplastics include polyacetal, polyacrylic, acrylonitrile-butadiene-styrene, polycarbonates, polystyrenes, polyethylene, styrene acrylonitrile, polypropylenes, polyethylene terephthalate, polybutylene terephthalate, nylons (6, 6/6, 6/10, 6/12, 11 or 12), polyamideimides, polyarylates, polyurethanes, thermoplastic olefins (i.e., polypropylene/impact modifiers such as ethylene, propylene and rubber), thermoplastic elastomers, polyarylsulfone, polyethersulfone, polyphenylene sulfide, polyvinyl chloride, chlorinated polyvinyl chloride, polysulfone, polyetherimide, polytetrafluoro ethylene, fluorinated ethylene propylene, perfluoroalkoxy, polychlorotrifluoro ethylene, ethylene tetrafluoro ethylene, polyvinylidene fluoride, polyvinyl fluoride, polyetherketone, polyether etherketone and polyether ketone ether ketone ketone. Specific examples of alloys and blends include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, thermoplastic elastomer alloys, nylon/elastomers, polyester/elastomers, polyethylene terephthalate/polybutyl terephthalate, acetal/elastomer, styrene-maleicanhydride/acrylonitrile-butadiene-styrene, polyether etherketone/polyethersulfone, polyethylene/nylon and polyethylene/acetal. Specific examples of inorganic polymers include phosphorus based compounds and silicons.

Carbon Fibrils

The carbon fibrils preferably comprise a combination of discrete fibrils and fibril aggregates. However, the fibrils may all be in the form of aggregates. The aggregates, when present, are generally of the bird's nest, combed yarn or open net morphologies. The more "entangled" the aggregates are, the more processing will be required to achieve a suitable composition. This means that the selection of combed yarn or open net aggregates is most preferable for the majority of applications. However, bird's nest aggregates will generally suffice.

As described in detail below, the reduction in the size of fibril aggregates below a given point results in a conductive polymeric composition having improved toughness. Accordingly, it is preferable to have a substantial portion of the fibrils in discrete form. This minimizes the number of large aggregates which must undergo reduction or which, in the end product, could provide a physical disruption which deleteriously affects toughness.

Dispersion of Carbon Fibrils in Polymers

The fibrils are distributed in the polymer(s) using, for example, a high-intensity mixer manufactured by Henschel. Shear is then applied using, for example, a co-rotating twin screw extruder available from Werner-Pfleiderer, a counter rotating twin screw extruder manufactured by Leistritz or a Ko-Kneader produced by Buss, to diminish the size of any fibril aggregates. The shear is applied until substantially all of the existing aggregates, as measured on an area basis, have been reduced to less than about 35 μm in diameter and preferably at least 90%, as measured on an area basis, of the aggregates are less than about 25 μm in diameter. More preferably the shear is applied until substantially all of the aggregates, as measured on an area basis, are less than about 5 μm in diameter with, yet more preferably, 98% of the aggregates less than about 3 μm in diameter, as measured on an area basis.

Generally, dispersion techniques used in the processing of carbon black filled polymers are not effective in dispersing carbon fibrils in polymers. For example, a 2-roll mill, when used in accordance with normal carbon black processing techniques, is generally ineffective in dispersing carbon fibrils in polymeric materials. Similarly, a single screw extruder or an internal mixer will generally not sufficiently and uniformly disperse fibrils in polymeric materials.

Dispersion of Carbon Fibrils in Masterbatch Mixtures

Masterbatches, which contain high concentrations of carbon fibrils, are preferably employed when the selected polymeric material is of a low melt or processing viscosity. Fibrils are more easily dispersed in masterbatches because their presence in greater concentrations enhances shear forces which cause dispersion.

A masterbatch, which may be subsequently diluted, is made by adding 1.0–60 weight percent of carbon fibrils to one or more selected polymers. The fibrils, at least a portion of which are in the form of aggregates, are distributed in the polymers and then shear is applied to reduce substantially all of the aggregates, as measured on an area basis, to less than about 50 μm in diameter, with 90% of the aggregates, as measured on an area basis, less than about 35 μm in diameter. More preferably the shear is applied until, as measured on an area basis, substantially all of the aggregates are less than about 7 μm in diameter.

Certain process guidelines, which are not common to carbon black, should be followed to achieve the desired properties for fibril masterbatches. Low melt viscosity resin 2-roll mill at 260° C. A 5 g quantity of fibrils with at least 95% of the mass of the fibrils comprising bird's nest aggregates greater than 100 μm in diameter, was added. The mixture was then milled for about 10 minutes, in accordance with carbon black incorporation techniques. The blend was then pelletized with a single screw extruder.

TABLE I

| EXAMPLE | POLYAMIDE (grams) | FIBRILS (grams) | RESIN FORM | COMPOUNDING EQUIPMENT | MASTERBATCH FIBRIL LOADING (%) |
| --- | --- | --- | --- | --- | --- |
| 1 | 95 | 5 | pellet | 2 roll mill | — | grades are preferred for masterbatch preparation to allow for penetration of the resin into the volume occupied by the fibril aggregates. Similarly, process temperatures should be set higher initially to lower resin viscosity. This permits penetration and effective "wetting" or incorporation. Downstream temperatures are preferably set lower to aid dispersive mixing through higher shear stresses which reduce aggregate sizes. This combination of distributive mixing followed by dispersive mixing in one process step is not typical in carbon black processing.

End Products

A fibril loaded polymeric composition is ultimately formed into a preselected shape by injection molding, blow molding, RIM, extrusion, etc. The fibril loaded, shaped product is conductive and has toughness characteristics superior to other filled conductive, static-dissipative or anti-static polymeric products. While other filler products have been shown to endow end products with superior flexural and tensile strength, until now, no filler has provided these properties coupled with conductivity, high notched impact strength and high tensile elongation. As described above, the reduction of substantially all fibril aggregates, in a polymeric material, below a particular size, provides an end product with notched impact strength and/or tensile elongation close to that of end products made with the virgin polymer. This permits the use of untreated polymeric materials in a wide range of applications previously limited to metals and other inherently conductive materials. Examples of end products include automobile parts suitable for electrostatic painting, appliance housing components suitable for electrostatic painting, computer housings capable of EMI shielding, and integrated circuit trays and microelectronics packaging materials suitable for static dissipation.

EXAMPLES

Examples of the preparation of conductive, high toughness polymeric compositions comprising carbon fibrils are set forth below, the results of which are shown in Tables I–IX.

Example I

A Standard Carbon Black Processing Procedure

Example 1

A standard procedure used in the production of carbon black enhanced conductive polymers was followed. A 100 g quantity of polyamide terpolymer pellets was dispersed on a Example II Low Impact Strength Polymeric Composition Example 2A Polyamide-6 pellets, injection-molding grade, and carbon fibrils, with at least 95% of the mass of the fibrils comprising bird's nest aggregates greater than 100 μm in diameter, were dried at 110° C. for 12–16 hours and fed to a Werner-Pfleiderer ZSK-30 co-rotating twin screw extruder using auger feeders, at a weight ratio of 95:5, resin to fibrils. The extruder was set up with less than 25% high shear kneading elements. Throughput was 15–20 lbs/hr. Process temperatures were set in 5° C. gradations from 265° C. at the feed throat to 250° C. at the die. The screw speed was 115 RPM. The product was strand pelletized, then dried at 120° C. for 12 hours. It was then molded on a 44-ton injection machine, available from Negri-Bossi, with a melt temperature of 250° C. and a mold temperature of 65° C., into bars having ¼"×½"×6" dimensions.

Example 2B

The procedure of Example 2A was repeated at a ratio of 85:15, resin to fibrils, to create an intermediate masterbatch. Process conditions were the same as in Example 2A except that throughput was 8–11 lbs/hr. A 100g quantity of this masterbatch material was then blended with 200 g polyamide-6 pellets, extrusion grade, for a final ratio of 95:5, resin to fibrils. The pellet blend was then injection molded at the same conditions used in Example 2A.

Example 2C

The procedures of Example 2B were repeated using pulverized, injection-molding grade, polyamide-6 resin, having a particle size less than 500 μm, as a feed material. Prior to extrusion, the resin was pre-blended with carbon fibrils, comprising bird's nest aggregates, in a high-intensity mixer, available from Henschel, for 1–3 minutes.

Example 2D

The procedures of Example 2C were repeated using a Leistritz GG-34 counter rotating twin screw extruder. The extruder was set-up in a high shear mode. Process temperatures were set in 10° C. gradations from 300° C. in the feed throat to 270° C. at the die. The screw speed was 150 RPM. Throughput was 7–10 lbs/hr.

Example 2E

Polyamide-6 pellets with no added carbon fibrils were fed to the extruder at the same process conditions as described in Example 2A. The composition was then pelletized and injection molded.

Example 3C

Polycarbonate was blended with styrene-acrylonitrile and polybutadiene and fed to the Buss Ko-kneader at the same conditions described in Example 3A. The composition was then pelletized and injection molded.

TABLE II

| EXAMPLE | POLYAMIDE (grams) | FIBRILS (grams) | RESIN FORM | COMPOUNDING EQUIPMENT | SCREW LEVEL | MASTERBATCH FIBRIL LOADING (%) |
|---|---|---|---|---|---|---|
| 2A | 95 | 5 | pellet | Twin screw | Low | — |
| 2B | 95 | 5 | pellet | Twin screw | Low | 15 |
| 2C | 95 | 5 | powder | Twin screw | Low | 15 |
| 2D | 95 | 5 | powder | Twin screw | High | 15 |
| 2E | 100 | 0 | pellet | Twin screw | Low | — |

Example III

A High Impact Strength Polymeric Composition

Example 3A

Low viscosity grade polycarbonate resin was pulverized to less than 500 μm and pre-blended with carbon fibrils, with at least 95% of the mass of the fibrils comprising combed yarn aggregates greater than 100 μm in diameter, at a weight ratio of 80:20, resin to fibrils, in a Henschel high-intensity mixer. This blend was fed to a Buss 70mm Ko-kneader set up in a medium shear mode for compounding and pelletizing of this masterbatch product. The process temperature was set at 280° C. The screw speed was 175 RPM. Throughput was 70–100 lbs/hr.

The pelletized product was blended with polycarbonate ("PC"), polybutadiene and styrene acrylonitrile ("SAN") to give a mixture having 2% carbon fibrils, 69% polycarbonate and 29% acetonitrile-butadiene-styrene ("ABS"). This mixture was passed through the kneader under the same conditions as set forth above, but with a 260° C. temperature. The product was dried for 4 hours at 120° C. and injection molded on a 70-ton machine, available from Van Dorn, at a melt temperature of 275° C. and a mold temperature of 70° C.

Example 3B

The procedures of Example 3A were repeated with 90:10 ratio, resin to fibrils, and fed to a Werner-Pfleiderer ZSK-30 co-rotating twin screw extruder. The extruder was set-up with greater than 50% high shear kneading elements. The throughput was 9–15 lbs/hr. Process temperatures were set in 5° C. gradations from 300° C. in the feed throat to 280° C. at the die. The screw speed was 150–200 RPM.

TABLE III

| EXAMPLE | POLYCARBONATE/ABS (grams) | FIBRILS (grams) | RESIN FORM | COMPOUNDING EQUIPMENT | MASTERBATCH FIBRIL LOADING (%) |
|---|---|---|---|---|---|
| 3A | 98 | 2 | powder | Ko-Kneader | 20 |
| 3B | 98 | 2 | powder | Twin screw | 10 |
| 3C | 100 | 0 | pellet | Ko-Kneader | — |

Measurement of Conductivity, Aggregate Size and Mechanical Strength

For each example containing fibril aggregates, at least two sections of the final product were cut, at less than 1 μm thickness, with an ultra microtome having a diamond blade, to determine the degree of dispersion. The sections were examined under an optical microscope at 100× magnification. The largest observed hydrodynamic diameter of fibril aggregates was reported and the area of the viewing region occupied by these agglomerates was calculated. Volume and/or surface resistivity were measured according to ASTM procedures D-257. Static decay was measured by a model 617 electrometer available from Keithley. IZOD notched impact strength was measured according to ASTM procedures D-256. Tensile strength, modulus and elongation; flexural strength and modulus; and unnotched IZOD impact strength were measured for some examples.

TABLE IV

| EXAMPLE | LARGEST PARTICLE SIZE (μm) | VOLUME RESISTIVITY (Ω-cm) | IZOD NOTCHED IMPACT STRENGTH (ft-lbs/in) |
|---|---|---|---|
| 1 | 100 | $>10^{13}$ | Not measured |
| 2A | 130 | $5 \times 10^8$ | 0.26 |

TABLE IV-continued

| EXAMPLE | LARGEST PARTICLE SIZE (μm) | VOLUME RESISTIVITY (Ω-cm) | IZOD NOTCHED IMPACT STRENGTH (ft-lbs/in) |
|---|---|---|---|
| 2B | 70 | $3 \times 10^6$ | 0.46 |
| 2C | 5 | $2 \times 10^3$ | 0.69 |
| 2D | 5 | $2 \times 10^6$ | Not measured |
| 2E | — | $>10^{13}$ | 0.77 |

TABLE V

| EXAMPLE | LARGEST PARTICLE SIZE (μm) | VOLUME RESISTIVITY (Ω-cm) | IZOD NOTCHED IMPACT STRENGTH (ft-lbs/in) | TENSILE STRENGTH (psi) | TENSILE MODULUS (psi) | FLEX STRENGTH (psi) | FLEX MODULUS (psi) |
|---|---|---|---|---|---|---|---|
| 3A | 5 | $5 \times 10^2$ | 9.2 | 6,900 | 280,000 | 11,400 | 340,000 |
| 3B | 5 | $>10^{10}$ | 9.7 | 6,600 | N/A | N/A | N/A |
| 3C | — | $>10^{13}$ | 10.3 | 7,200 | 280,000 | 11,900 | 350,000 |

Fibril Loading in Low and High Impact Polymeric Compositions

Example I demonstrates the inapplicability of one standard carbon black processing technique to carbon fibril polymeric compositions. A 2-roll mill, commonly used to disperse carbon black, failed to properly distribute and disperse fibrils in the polymeric material. This is shown by the high resistivity of the sample.

Example II shows that a relationship exists between processing techniques and mechanical properties for fibril loaded, polymeric compositions. The filled polymers of Examples 2A and 2B, which exhibited lower conductivity and impact strength than that of Example 2C, confirm that conventional carbon black processing techniques are generally insufficient to achieve desired conductivity and mechanical strength in fibril filled polymeric compositions. Microstructure evaluation of samples of these examples showed that only compositions having substantially all of their fibril aggregates, as measured on an area basis, less than 5 μm in diameter, yielded the desired combination of electrical conductivity and mechanical strength or toughness.

Table VI is a graph of particle size versus IZOD notched impact strength, as set forth in Table IV. While, on the whole, an essentially monotonic relationship exists between these two characteristics, within the particle size of 5–130 μm, the relationship appears to be linear. Reference to the curve in Table VI shows that a composition with fibrils, having a maximum aggregate size of less than 35 μm, will yield an end product with notched impact strength which is at least 75% of the notched impact strength of the virgin material. The combination of conductivity and high notched impact strength is necessary for applications such as automobile body parts and appliance housing components, which require conductivity for electrostatic coating and notched impact strength for breakage resistance.

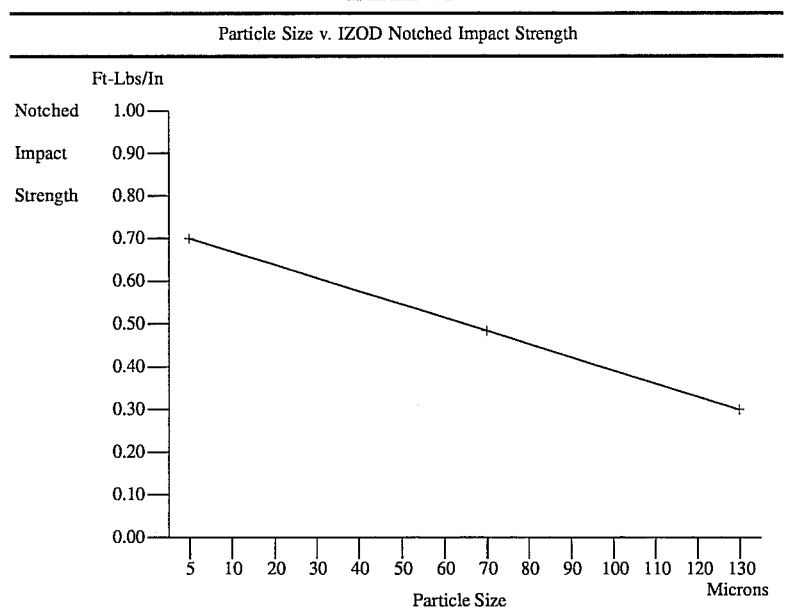

TABLE VI

Particle Size v. IZOD Notched Impact Strength

Masterbatch Use in Low and High Impact Fibril Polymeric Compositions

The use of a masterbatch to prepare a final composition is generally preferred for fibril polymeric compositions. (See Examples 2B–2D and 3A and 3B). Examples 2A and 2B have the same composition and are made from the same starting materials. However, an intermediate masterbatch was used to prepare the composition of Example 2B. Example 2C was made from a masterbatch but further differed in the use of a premixing step to distribute the fibrils in the powdered resin.

Since masterbatches have a higher concentration of fibrils than do end products, the overall work input per unit mass used to disperse the fibrils throughout a polymeric masterbatch material is generally less. However, when a masterbatch is subsequently diluted with additional polymeric or other materials, further work input is incurred to properly mix the diluent with the masterbatch. As a result of these characteristics, the fibril aggregates sizes in masterbatch compounds may be slightly larger than those in the final composition, e.g., less than about 50 μm.

Though the notched impact strengths achieved in Examples 2A–2C do not meet industry standards for most applications, a direct correlation between particle size and notched impact strength, was recognized. (See Table VI). Based upon this recognition, a high impact strength resin was selected for combination with carbon fibrils in which, as measured on a weight basis, substantially all of the fibril agglomerates were reduced to diameters of less than 5 μm. (See Example III).

In Example 3A, the procedures used in Example 2C were adapted for the higher impact resin system. As shown in Table V, a conductive compound was achieved with an IZOD notched impact strength of 9.2 ft-lbs/in. This is well above normal industry standards and is approximately 90% of the notched impact strength of that of the virgin material.

Examples 3A–3C all used a polymer blend in which acrylonitrile-butadiene-styrene ("ABS") remains a discrete phase in the polycarbonate ("PC") continuous matrix. Since the fibril masterbatch comprised PC and not ABS, nearly all of the fibrils remained in the PC phase. This phenomenon creates a fibril concentration which is effectively higher than that of the bulk composition resulting in lower resistivity than a comparable homopolymer system.

Overworking of Fibril Polymeric Composition

Examples 2D and 3B demonstrate that over-shear or over-dispersion can cause deterioration of electrical properties in fibril polymeric compositions. The screw set-ups in these examples were very high in shear. This high-shear processing resulted in samples exhibiting drastically reduced conductivity. Thus, when work input is applied to the composition to reduce the size of substantially all of the fibril agglomerates to less than 5 μm, the conductivity of the composition should be monitored.

Since notched impact strength appears to increase with additional work input, it may not be necessary to stop the additional work input when conductivity begins to decline. Rather, work input can be discontinued when conductivity approaches the end of acceptable levels. This generally occurs when volume resistivity is greater than $1\times10^{11}$ ohm-cm for anti-static or electrostatic dissipative applications, $1\times10^{7}$ ohm-cm for electrostatic painting applications and $1\times10^{2}$ ohm-cm for EMI shielding applications.

Example IV

Masterbatch Dilutions of Fibril Loaded Polymeric Compositions

Example 4A

The masterbatch prepared in Example 2C was blended with polyamide and poly(phenylene ether) ("PPE") to make a composition with a final content of 3wt % carbon fibrils and 97wt % resin, approximately equal parts of polyamide and PPE. The composition was then processed through a Werner-Pfleiderer twin screw extruder and injection molded.

Example 4B

Ketjen Black EC-600 JD, a highly conductive carbon black available from Akzo, was blended with polyamide and PPE to make a composition with final content of 3 wt % Ketjen Black and 97 wt % resin, approximately equal parts of polyamide and PPE. The composition was then processed through a Werner-Pfleiderer twin screw extruder and injection molded.

Example 4C

Polyamide and PPE were blended in approximately equal parts and processed through a Werner-Pfleiderer ZSK-30 twin screw extruder having a screw set-up with less than 25% high shear kneading elements. It was then injection molded.

Measurement of Conductivity, Aggregate Size and Mechanical Strength

Measurements of conductivity, aggregate size and mechanical strength were conducted in accordance with the procedures previously set forth Examples I, II and III.

TABLE VII

| EXAMPLE | POLYAMIDE-6/ PPE (grams) | FIBRILS (grams) | KETJEN-BLACK (grams) | MASTER-BATCH USED | LARGEST PARTICLE SIZE (μm) | VOLUME RESISTIVITY (Ω-cm) | IZOD NOTCHED IMPACT STRENGTH (ft-lbs/in) | IZOD NOTCHED IMPACT STRENGTH (% of virgin material) |
|---|---|---|---|---|---|---|---|---|
| 4A | 97 | 3 | 0 | 2C | 5 | $10^6$ | 8.0 | 88.9 |
| 4B | 97 | 0 | 3 | — | 5 | $10^6$ | 3.5 | 38.8 |
| 4C | 100 | 0 | 0 | — | — | $>10^{13}$ | 9.0 | 100 |

Comparison of a Fibril Loaded Composition to a Carbon Black Loaded Composition and the Virgin Polymeric Composition Example 4A illustrates, with another high impact resin system, that properly processed, fibril loaded, polymeric compounds can achieve conductivity without significantly causing deterioration of the physical properties of the host resin. As with Example 3A, almost 90% of the notched impact strength of the virgin polymeric material was realized in Example 4A.

As shown by Example 4B, a highly conductive carbon black filled polymeric composition has acceptable conductivity, but does not have physical characteristics commensurate with the fibril loaded polymeric composition. The carbon black filled composition provided IZOD notched impact strength of less than 40% of the virgin polymeric composition.

Example V

Polymeric Compositions with Morphologically Different Fibril Agglomerates

Example 5A

The masterbatch prepared in Example 3A was blended with a high viscosity grade polycarbonate sold under the tradename, LEXAN® 101, by G. E. Plastics, to give a final ratio of 97:3, resin to fibrils, and fed to a Werner-Pfleiderer ZSK-30 twin screw extruder for mixing and pelletizing. This product was dried and injection molded.

Example 5B

The procedure of Example 3A was repeated with carbon fibrils, comprising bird's nest aggregates, at a ratio of 85:15, resin to fibrils, using a Werner-Pfleiderer ZSK-30, having a screw set-up with less than 25% high shear kneading elements. Process temperatures were set in 5° C. increments from 300° C. in the feed throat to 280° C. at the die. Screw speed was 150–175 rpm and throughput was 12–15 lbs/hour during masterbatch preparation.

Masterbatch dilution was accomplished according to the method used in Example 5A.

Example 5C

LEXAN® 101, polycarbonate resin, was blended with Ketjen Black EC-600JD resin at a ratio of 97:3, resin to fibrils, in a Werner-Pfleiderer ZSK-30 twin-screw extruder and injection molded, according to standard carbon black processing techniques.

Example 5D

LEXAN® 101, polycarbonate resin, was blended with Ketjen Black EC-600JD at a weight ratio of 95.5:4.5, resin to fibrils, using a Werner-Pfleiderer ZSK twin-screw extruder. The product was then injection molded.

Example 5E

No virgin LEXAN® 101, polycarbonate material was actually prepared. Instead, the mechanical properties of the virgin material were extracted from G. E. Plastic's published product literature.

TABLE VIII

| EXAMPLE | POLY-CARBONATE (grams) | FIBRILS (grams) | KETJEN BLACK (grams) | LARGEST PARTICLE SIZE (μm) | VOL. RES. (Ω-cm) | SURF. RES. (Ω/sq) | IZOD NOTCHED IMPACT STRENGTH (ft-lbs/in) | IZOD NOTCHED IMPACT STRENGTH (% of virgin material) |
|---|---|---|---|---|---|---|---|---|
| 5A | 97 | 3 (CY) | 0 | 5 | $10^4$ | $10^9$ | 10.7 | 62.9 |
| 5B | 97 | 3 (BN) | 0 | 5 | $10^4$ | $10^{10}$ | 2.7 | 15.8 |
| 5C | 97 | 0 | 3 | 5 | $10^8$ | $10^{14}$ | 1.4 | 8.2 |
| 5D | 95.5 | 0 | 4.5 | 5 | $10^4$ | $10^8$ | 1.4 | 8.2 |
| 5E | 100 | 0 | 0 | — | $>10^{15}$ | $>10^{15}$ | 17 | 100 |

Measurement of Conductivity, Aggregate Size and Mechanical Strength

Measurements of conductivity, aggregate size and mechanical strength were conducted in accordance with the procedures previously set forth for Examples I, II and III. The data for Example 5E was taken from G. E. Plastics product literature for LEXAN® 101.

Comparison of Morphologically Different Fibril Agglomerate Polymeric Compositions to Carbon Black Loaded Polymeric Compositions and the Virgin Polymeric Composition Examples 5A–5E provide another illustration that conductive compounds containing carbon fibrils have significantly higher toughness than do compounds containing highly-conductive carbon black. A carbon black loaded polymeric compound with the same conductivity level as a fibril loaded polymeric compound does not have mechanical properties which are as good as the fibril loaded polymeric compounds. (See Examples 5A, 5B and 5D). Fibril polymeric compounds with the same filler loading level as carbon black have better notched impact strength and conductivity.

The difference in notched impact strength between examples 5A and 5B can be accounted for by the morphology of the fibril aggregates. Combed yarn fibrils, as compared to bird's nest fibrils, initially comprise more parallel, less entangled aggregates which are more easily broken down into much smaller aggregates when compounded. Thus, the less the fibril aggregates are initially entangled, the better the mechanical properties of the final polymeric composition.

Example VI

A Flexible Polymeric Composition

Example 6A

Thermoplastic urethane ("TPU") resin powder was blended with carbon fibrils, comprising bird's nest aggregates, in a Henschel high-intensity mixer and processed on Werner-Pfleiderer ZSK-30 twin screw extruder at a ratio of 85:15, resin to fibrils, to make a masterbatch. The masterbatch was mixed with TPU pellets in a co-rotating twin-screw extruder to give a final fibril loading of 3 wt %. The compound was then injection molded.

Example 6B

The masterbatch of Example 6A was diluted to give a final fibril loading of 5 wt % according to the procedures of Example 6A, and injection molded.

Example 6C

TPU powder was mixed with fibrils to achieve a ratio of 97:3, resin to fibrils. The mixture was blended using a Henschel high intensity mixer, fed to a Werner-Pfleiderer ZSK-30 twin screw extruder and then injection molded.

Example 6D

TPU powder was mixed with fibrils to achieve a ratio of 95:5, resin to fibrils. The mixture was blended using a Henschel high intensity mixer, fed to a Werner-Pfleiderer ZSK-30 twin screw extruder and then injection molded.

Example 6E

The masterbatch of Example 6A was blended with TPU pellets and glass fibers and fed to a twin screw extruder with high-shear screw set-up to achieve a compound with a weight ratio of 33:1, resin to fibrils.

Example 6F

TPU pellets of the same grade as in Example 6A, without any filler material, were injection molded.

Measurement of Conductivity, Aggregate Size and Mechanical Strength

Measurements of conductivity, aggregate size and mechanical strength were conducted in accordance with the procedures previously set forth Examples I, II and III.

Fibril Loading in a Flexible Polymeric Composition

Example pairs 6A and 6C and, 6B and 6D provide a comparison between masterbatch and direct compounding techniques. In this system, both techniques yielded samples with equivalent electrical conductivity and mechanical strength. This differs from the results of Example II, possibly due to the higher melt processing viscosity of TPU as compared to polyamide-6. The higher viscosity of the TPU apparently provides adequate shear stresses, when lower concentrations of fibrils are used, to reduce the size of any fibril aggregates. This yields components with good conductivity and toughness. Toughness here is represented by tensile elongation.

A comparison of Examples 6A and 6C to Example 6E illustrates that inert filler materials do not have an appreciable effect on conductivity. Example 6E contained less than 2 wt % fibrils in the bulk composition but 3 wt % versus the resin. The rest was glass fibers. The equivalent conductivity between these samples demonstrates that the glass fibers are a discrete second phase which does not affect electrical properties.

TABLE IX

| EXAMPLE | TPU (grams) | FIBRILS (grams) | GLASS FIBERS (grams) | FIBRIL LOADING IN MASTER-BATCH (wt %) | LARGEST PARTICLE SIZE (μm) | VOL. RES. (Ω-cm) | SURF. RES. (Ω/sq) | STATIC DECAY (sec.) | TENSILE ELONGATION (%) |
|---|---|---|---|---|---|---|---|---|---|
| 6A | 97 | 3 | 0 | 15 | 10 | $10^7$ | $10^{11}$ | <0.01 | — |
| 6B | 95 | 5 | 0 | 15 | 10 | $10^4$ | $10^7$ | <0.01 | — |
| 6C | 97 | 3 | 0 | — | 20 | $10^{6-7}$ | $>10^{13}$ | <0.01 | 470 |
| 6D | 95 | 5 | 0 | — | 20 | $10^4$ | $10^7$ | <0.01 | 420 |
| 6E | 97 | 3 | 43 | 15 | 10 | $10^7$ | $>10^{13}$ | <0.01 | — |
| 6F | 100 | 0 | 0 | — | — | $>10^{12}$ | $>10^{13}$ | — | 550 |

Samples of Examples 6C and 6E had no detectable surface conductivity. However, the static decay properties of these samples were acceptable. This dichotomy exists because an insulating surface layer of polymer prevents conductivity detection, but can allow static voltage to dissipate quickly. This is verified by the adequately low volume resistivity levels, which are measured internally, rather than at the surface of the sample.

Although the invention has been described with reference to specific examples, they should not be construed as limiting since they are merely illustrative of the invention. One of skill in the art may alter the described examples without departing from the spirit or scope of the invention.

We claim:

1. A polymeric composition comprising a polymeric binder and 0.25–50 wt % of graphite carbon fibrils, said fibrils being substantially cylindrical with a substantially constant diameter, having c-axes substantially perpendicular to their cylindrical axis, being substantially free of pyrolytically deposited carbon, and having a diameter between 3.5 and 70 nanometers, wherein said composition has IZOD notched impact strength greater than about 2 ft-lbs/in and volume resistivity less than about $1 \times 10^{11}$ ohm-cm.

2. A composition according to claim 1, wherein, at least a portion of said fibrils are in the form of aggregates.

3. A composition according to claim 2, wherein, as measured on an area basis, substantially all of said aggregates are less than about 35 μm in diameter.

4. A polymeric composition comprising a polymeric binder and 0.25–50 wt % of graphitic carbon fibrils, said fibrils being substantially cylindrical with a substantially constant diameter, having c-axes substantially perpendicular to their cylindrical axis, being substantially free of pyrolytically deposited carbon, and having a diameter between 3.5 and 70 nanometers, wherein said composition has improved toughness and volume resistivity less than $1\times10^{11}$ ohm-cm, wherein at least a portion of said fibrils are in the form of aggregates and, wherein, as measured on an area basis, substantially all of said aggregates are less than about 35 µm in diameter.

5. A composition according to claim 4, wherein at least 90% of said aggregates, as measured on an area basis, are less than about 25 µm in diameter.

6. A composition according to claim 4, wherein, as measured on an area basis, substantially all of said aggregates are less than about 5 µm in diameter.

7. A composition according to claim 6, wherein, as measured on an area basis, at least 98% of said aggregates are less than about 3 µm in diameter.

8. A composition according to claim 4, wherein the amount of said fibrils in said composition is between about 2–5 wt %.

9. A composition according to claim 4, wherein said composition has IZOD notched impact strength greater than about 3 ft-lbs/in.

10. A composition according to claim 9, wherein said composition has IZOD notched impact strength greater than about 5 ft-lbs/in.

11. A composition according to claim 4, wherein said composition has surface resistivity less than about $1\times10^{12}$ ohm/sq.

12. A composition according to claim 4, wherein said polymeric binder comprises thermoplastics, thermosets, elastomers, alloys or blends.

13. A polymeric composition comprising a polymeric binder and 0.25–50 wt % of graphite carbon fibrils, said fibrils being substantially cylindrical with a substantially constant diameter, having c-axes substantially perpendicular to their cylindrical axis, being substantially free of pyrolytically deposited carbon, and having a diameter between about 3.5 and 70 nanometers, wherein at least a portion of said fibrils are in the form of aggregates and wherein, as measured on an area basis, substantially all of said aggregates are less than about 35 µm in diameter, and wherein said composition has volume resistivity less than about $1\times10^{11}$ ohm-cm.

14. A composition according to claim 13, wherein at least 90% of said aggregates, as measured on an area basis, are less than about 25 µm in diameter.

15. A composition according to claim 13, wherein, as measured on an area basis, substantially all of said aggregates are less than about 5 µm in diameter.

16. A composition according to claim 15, wherein, as measured on an area basis, at least 98% of said aggregates are less than about 3 µm in diameter.

17. A polymeric composition comprising 0.25–50 wt % of graphitic carbon fibrils, said fibrils being substantially cylindrical with a substantially constant diameter, having c-axes substantially perpendicular to their cylindrical axis, being substantially free of pyrolytically deposited carbon, and having a diameter between 3.5 and 70 nanometers, wherein at least a portion of said fibrils are in the form of aggregates, said composition being substantially free, as measured on an area basis, of fibril aggregates having a diameter greater than about 35 µm and wherein at least 90%, as measured on an area basis, of said fibril aggregates are less than about 25 µm in diameter, wherein said composition has volume resistivity less than about $1\times10^{11}$ ohm-cm.

18. A composition according to claim 17, wherein substantially all of said aggregates are filled with the polymeric composition, within the volume defined by each individual aggregate.

19. A composition according to claim 17, wherein said composition is substantially free, as measured on an area basis, of fibril aggregates greater than about 5 µm.

20. A composition according to claim 19, wherein, as measured on an area basis, at least 98% of said aggregates are less than 3 µm in diameter.

21. A polymeric composition comprising 0.25–50 wt % of graphitic carbon fibrils, said fibrils being substantially cylindrical with a substantially constant diameter, having c-axes substantially perpendicular to their cylindrical axis, being substantially free of pyrolytically deposited carbon, and having a diameter between 3.5 and 70 nanometers, wherein said composition has IZOD notched impact strength greater than 75% of the IZOD notched impact strength of said composition without said fibrils and wherein said composition has volume resistivity less than about $1\times10^{11}$ ohm-cm.

22. A composition according to claim 21, wherein at least a portion of said carbon fibrils are in the form of aggregates.

23. A composition according to claim 22, wherein, as measured on an area basis, substantially all of said aggregates are less than about 35 µm in diameter.

24. A composition according to claim 23, wherein, as measured on an area basis, substantially all of said aggregates are less than about 5 µm in diameter.

25. A composition according to claim 21, wherein said composition has IZOD notched impact strength greater than 85% of the IZOD notched impact strength of said composition without said fibrils.

26. A polymeric composition comprising 0.25–50 wt % of carbon fibrils said fibrils being substantially cylindrical with a substantially constant diameter, having c-axes substantially perpendicular to their cylindrical axis, being substantially free of pyrolytically deposited carbon, and having a diameter between about 3.5 and 70 nanometers, wherein at least a portion of said fibrils are in the form of aggregates and wherein, as measured on an area basis, substantially all of said aggregates are less than about 5 µm in diameter.

27. A polymeric masterbatch composition comprising 1.0–60 wt % of graphic carbon fibrils, said fibrils being substantially cylindrical with a substantially constant diameter, having c-axes substantially perpendicular to their cylindrical axis, being substantially free of pyrolytically deposited carbon, and having a diameter between 3.5 and 70 nanometers, wherein at least a portion of said fibrils are in the form of aggregates, said composition being substantially free, as measured on an area basis, of fibril aggregates greater than about 50 µm and wherein, as measured on an area basis, at least 90% of said fibril aggregates are less than about 35 µm in diameter.

28. A filled polymeric composition having improved toughness and volume resistivity less than $1\times10^{11}$ ohm-cm, prepared by a process comprising:

(a) combining between 0.25–50 wt % of graphitic carbon fibrils, said fibrils being substantially cylindrical with a substantially constant diameter, having c-axes substantially perpendicular to their cylindrical axis, being substantially free of pyrolytically deposited carbon, and having a diameter between 3.5 and 70 nanometers, with a polymeric material, wherein at least a portion of said fibrils are in the form of aggregates;

(b) mixing said combination to distribute said fibrils in said polymeric material; and (c) applying shear to said combination to break down said aggregates until, as measured on an area basis, substantially all of said aggregates are less than about 35 µm in diameter.

29. A polymeric composition comprising 0.25–50 wt % of graphic carbon fibrils, said fibrils being substantially cylindrical with a substantially constant diameter, having c-axes substantially perpendicular to their cylindrical axis, being substantially free of pyrolytically deposited carbon, and having a diameter Between 3.5 and 70 nanometers, wherein said composition has tensile elongation of at least 75% of the tensile elongation of said composition without said fibrils and wherein said composition has volume resistivity less that about $1\times10^{11}$ ohm-cm.

30. A composition according to claim 29, wherein at least a portion of said carbon fibrils are in the form of aggregates.

31. A composition according to claim 30, wherein, as measured on an area basis, substantially all of said aggregates are less than about 35 μm in diameter.

32. A composition according to claim 31, wherein, as measured on an area basis, substantially all of said aggregates are less than about 5 μm in diameter.

33. A composition according to claim 29, wherein said composition has tensile elongation of at least 85% of the tensile elongation of said composition without said fibrils.

* * * * *

UNITED STATES PATENT AND TRADEMARK OFFICE
CERTIFICATE OF CORRECTION

PATENT NO.  :  5,591,382
DATED       :  January 7, 1997
INVENTOR(S) :  Nahass et al.

It is certified that error appears in the above-indentified patent and that said Letters Patent is hereby corrected as shown below:

Claim 1, line 2, please replace the word "graphite" with the word --graphitic--.

Claim 13, line 2, please replace the word "graphite" with the word --graphitic--.

Claim 26, line 2, before the word "carbon", please insert --graphitic--.

Claim 27, line 2, please replace the word "graphic" with the word --graphitic--.

Claim 29, line 2, please replace the word "graphic" with the word --graphitic--.

Claim 29, line 6, please replace the word "Between" with the word --between--.

Signed and Sealed this

Eighth Day of April, 1997

Attest:

BRUCE LEHMAN

*Attesting Officer*  *Commissioner of Patents and Trademarks*